United States Patent
Komatsu et al.

(10) Patent No.: US 7,041,262 B2
(45) Date of Patent: May 9, 2006

(54) METHOD FOR SEPARATING METAL IONS

(75) Inventors: Yu Komatsu, Ibaraki (JP); Shigekazu Tsurubou, Ibaraki (JP)

(73) Assignee: National Institute for Research in Inorganic Materials, Tsukuba (JP)

(*) Notice: Subject to any disclaimer, the term of this patent is extended or adjusted under 35 U.S.C. 154(b) by 517 days.

(21) Appl. No.: 10/316,923

(22) Filed: Dec. 12, 2002

(65) Prior Publication Data

US 2003/0108464 A1    Jun. 12, 2003

Related U.S. Application Data

(63) Continuation of application No. 09/795,481, filed on Mar. 1, 2001, now abandoned.

(30) Foreign Application Priority Data

Oct. 13, 2000    (JP) .............................. 2000-312887

(51) Int. Cl.
*B01D 15/00*    (2006.01)
(52) U.S. Cl. ........................ 423/157; 210/638; 210/681
(58) Field of Classification Search .................... 423/6, 423/8, 157, DIG. 14; 210/638, 681, 687
See application file for complete search history.

(56) References Cited

U.S. PATENT DOCUMENTS

| 4,668,397 A | 5/1987 | Shimizu et al. |
| 4,943,375 A | 7/1990 | Bradshaw et al. |
| 5,863,439 A | 1/1999 | Dietz et al. |
| 5,881,358 A | 3/1999 | Miyano et al. |

FOREIGN PATENT DOCUMENTS

| JP | 1-139142 | 5/1989 |
| JP | 3-28335 | 2/1991 |
| JP | 4-52233 | 2/1992 |
| JP | 10-174950 | 6/1998 |

*Primary Examiner*—Steven Bos
(74) *Attorney, Agent, or Firm*—Oblon, Spivak, McClelland, Maier & Neustadt, P.C.

(57) ABSTRACT

A method for separating metal ions, which comprises adding a selective capturing agent to an aqueous solution containing plural types of metal ions, said selective capturing agent being a cyclic compound and forming a complex with metal ions having ion radii suitable for the size of the ring alone, so that unnecessary metal ions are held by the selective capturing agent in the aqueous solution, and bringing said aqueous solution into contact with an ion exchange solid phase so as to transport desired metal ions alone to the solid phase.

9 Claims, No Drawings

METHOD FOR SEPARATING METAL IONS

The present invention relates to a method for separating metal ions. More particularly, the present invention relates to a method for separating metal ions by separating a specific type of metal ions while preventing inclusion of impurities to obtain metal ions with a high purity.

As a method for separating metal ions, an ion exchange method and a solvent extraction method are well known as representative examples.

The ion exchange method is a separation method utilizing a reaction wherein metal ions in an aqueous solution replace ions in an ion exchanger and undergo phase transition. The reaction amount is determined by the ratio of the amount of the ion exchanger to the amount of the aqueous solution, and the separative power shows a constant value depending upon the ion exchanger.

The solvent extraction method is a separation method utilizing a reaction wherein metal ions in an aqueous solution react with an extracting agent or a synergistic extracting agent dissolved in an organic solvent and undergo phase transition into an organic phase. The amount of the metal ions to be extracted depends on the type of the extracting agent or the synergistic extracting agent, and the separative power shows a constant value characteristic to the extracting agent or the synergistic extracting agent.

However, by either of the ion exchange method and the solvent extraction method as representative examples of the method for separating metal ions, inclusion of impurities is inevitable, and complete or substantially complete separation of desired metal ions is difficult.

Specifically, separation of alkaline earth metal ions will be explained as an example. In the ion exchange method, when a titania hydrate is employed as an ion exchanger, for example, in separation of Ca and Sr which are alkaline earth metal ions adjacent to each other, so much as 16% of impurities will be mixed.

Further, in the solvent extraction method, as the separative power is determined by the type of the extracting agent or the synergistic extracting agent, depending upon the type of the extracting agent or the synergistic extracting agent, inclusion of at least 1% of impurities may be inevitable in separation of Ca and Sr.

Under these circumstances, the present invention has been made to overcome the above drawbacks of conventional methods for separating metal ions, and it is an object of the present invention to provide a method for separating metal ions, which comprises separating a specific type of metal ions while preventing inclusion of impurities to obtain metal ions with a high purity.

The present invention provides a method for separating metal ions, which comprises adding a selective capturing agent to an aqueous solution containing plural types of metal ions, said selective capturing agent being a cyclic compound and forming a complex with metal ions having ion radii suitable for the size of the ring alone, so that unnecessary metal ions are held by the selective capturing agent in the aqueous solution, and bringing said aqueous solution into contact with an ion exchange solid phase so as to transport desired metal ions alone to the solid phase.

The present invention further provides the above method wherein the plural types of metal ions are in the same Group. The present invention further provides the above method wherein the plural types of metal ions are at least two types belonging to alkaline earth metal ions. The present invention still further provides the above method wherein the selective capturing agent is a cryptand or a crown ether.

Now, preferred embodiments of the method for separating metal ions of the present invention will be explained in further detail below.

In the method for separating metal ions of the present invention, a selective capturing agent which selectively captures specific types of metal ions is used. This selective capturing agent is a cyclic compound, and forms a complex with metal ions having ion radii suitable for the size of the ring alone.

In the method for separating metal ions of the present invention, the above selective capturing agent is added to an aqueous solution containing plural types of metal ions, and the aqueous solution is brought into contact with an ion exchange solid phase.

The selective capturing agent forms a metal complex with specific metal ions alone in the aqueous solution. This reaction takes place in accordance with a theoretical equilibrium value, and the metal ions forming a metal complex are held in the aqueous solution even after the reaction. Accordingly, in the aqueous solution, metal ion species forming a metal complex with the selective capturing agent and metal ion species not forming a metal complex are present, and there is a significant difference in the ion radius between them. Metal ions capable of being held in the aqueous solution are determined by the type of the selective capturing agent and the size of the metal ions, and the amount of metal ions held shows a characteristic value depending on the type of the selective capturing agent and the type of the metal ions.

When the aqueous solution in such a state is brought into contact with an ion exchange solid phase, the metal ion species not forming a metal complex alone transfers to the solid phase. The metal ion species forming a metal complex and having a large ion radius does not transfer. Based on this principle, in the method for separating metal ions of the present invention, unnecessary metal ions are held by the selective capturing agent in the aqueous solution, and desired metal ions alone are transferred to the solid phase. Accordingly, metal ions to be brought in the solid phase as impurities will drastically decrease. Therefore, according to the method for separating metal ions of the present invention, a specific type of metal ions can be completely or substantially completely separated while preventing inclusion of impurities, and metal ions with a high purity can be obtained. Further, the separation efficiency of metal ions will improve.

Here, in the method for separating metal ions of the present invention, it is possible to separate metal ions in the same Group. Metal ions in the same Group have the same reaction mechanism in an ion exchange reaction, and are likely to move to the ion exchange solid phase. However, metal ions other than desired ones are held by the selective capturing agent in the aqueous solution, whereby inclusion of impurities into the solid phase will be inhibited.

The selective capturing agent may optionally be determined depending upon the ion radii of metal ions to be held, and a cryptand or a crown ether may, for example, be mentioned. In order to improve complex-forming ability of the selective capturing agent, in the method for separating metal ions of the present invention, a water-soluble organic solvent such as propanol may be added to the aqueous solution.

Now, the present invention will be described in detail with reference to Examples. However, it should be understood that the present invention is by no means restricted to such specific Examples. Further, the type of metal ions, the type of the selective capturing agent and reaction conditions are not limited thereto.

EXAMPLE

Into an aqueous solution containing both ions of Ca and Sr as alkaline earth metals, cryptand [2.2.2] as a selective capturing agent was added and dissolved, and this aqueous solution was brought into contact with AMBERLITE 200CT as an ion exchange resin. After equilibrium was reached, the amounts of metal ions in the liquid phase and the solid phase were measured, and the results were compared with a case where an aqueous solution containing Ca and Sr ions was brought into contact with AMBERLITE 200CT without addition of cryptand [2.2.2]. Further, the results were compared with separation of Ca and Sr by conventional ion exchange method and solvent extraction method. In the ion exchange method, titania hydrate was used as the ion exchanger, and in the solvent extraction method, TTA (thenoyltrifluoroacetone) was used as an extracting agent, and TOPO (trioctylphosphineoxide) was used as a synergistic extracting agent.

The results are shown in the following Tables 1 and 2.

TABLE 1

| pH of aqueous solution | | 5 | 6 | 6.3–7.8 | 8 | 9 |
|---|---|---|---|---|---|---|
| Retention of Sr (%) | Cryptand [2.2.2] added | 27 | 88 | 100 | 88 | 33 |
| | Cryptand [2.2.2] not added | 0 | 0 | 0 | 0 | 0 |

TABLE 2

| | Inclusion ratio of Sr (%) |
|---|---|
| Present separation method | 0.00 (pH 6.3–7.8) |
| Ion exchange method | 16.00 |
| Solvent extraction method | 1.01 |

As shown in Table 1, Sr ions having a large ion radius undergo a complex-forming reaction with cryptand [2.2.2] and are held in the aqueous solution. On the contrary, Ca ions having a small ion radius do not react with cryptand [2.2.2] and move to the ion exchange resin as the solid phase. Cryptand [2.2.2] has Sr capturing properties in a pH of the aqueous solution of from 4 to 9, and particularly in a pH of from 6.3 to 7.8, it can capture 100% of Sr. Accordingly, when the aqueous solution is neutral or has a pH in the vicinity thereof, separation of Ca and Sr can be carried out completely or substantially completely.

When cryptand [2.2.2] is not added, both Ca ions and Sr ions move to the solid phase, and when the aqueous solution has a pH of from 2 to 12, 100% of both metal ions move to the solid phase. Accordingly, separation of Ca and Sr is impossible.

Further, as shown in Table 2, inclusion of impurities is inevitable in the conventional ion exchange method and solvent extraction method, whereas in the method for separating metal ions of the present invention, metal ions with a high purity, without inclusion of impurities, can be obtained.

As explained above, according to the method of the present invention, metal ions with a high purity can be obtained by separating a specific type of metal ions while preventing inclusion of impurities.

What is claimed is:

1. A method for separating strontium ions from other alkaline metal ions, comprising:
    adding a selective capturing agent to an aqueous solution containing alkaline earth metal ions, said selective capturing agent being a cyclic compound which forms complexes with strontium ions that have an ionic radius which permits complexation of the strontium ions based on the size of the ring of the cyclic compound alone, so that complexed strontium ions are retained by the selective capturing agent in the aqueous solution and not the alkaline earth metal ions other than strontium; and
    bringing said aqueous solution into contact with a solid phase ion exchange material so as to selectively adsorb uncomplexed alkaline earth metal ions onto the solid phase ion exchange material.

2. The method according to claim 1, wherein the selective capturing agent is a cryptand or a crown ether.

3. The method according to claim 2, wherein the cryptand is cryptand [2.2.2].

4. The method according to claim 1, wherein the selective capture of strontium ions occurs at a pH ranging from 4 to 9.

5. The method according to claim 4, wherein said pH ranges from 6.3 to 7.8.

6. The method according to claim 5, wherein the separated strontium contains less than 1% impurity alkaline earth ions.

7. A method for separating strontium ions from calcium ions, comprising:
    adding a cryptand as a selective capturing agent to an aqueous solution having a pH ranging from 4 to 9 and containing strontium and calcium ions, said cryptand capturing agent having a ring size that permits complexation of the strontium ions, thereby forming a complex with the strontium ions so that complexed strontium ions are retained by the selective capturing agent in the aqueous solution; and
    bringing said aqueous solution into contact with a solid phase ion exchange material so as to selectively adsorb uncomplexed calcium ions onto the solid phase ion exchange material.

8. The method according to claim 7, wherein said pH ranges from 6.3 to 7.8.

9. The method according to claim 7, wherein the cryptand is cryptand [2.2.2].

* * * * *